(12) United States Patent
Liebendorfer

(10) Patent No.: US 7,600,349 B2
(45) Date of Patent: Oct. 13, 2009

(54) LOW PROFILE MOUNTING SYSTEM

(75) Inventor: John E. Liebendorfer, Albuquerque, NM (US)

(73) Assignee: UniRac, Inc., Albuquerque, NM (US)

( * ) Notice: Subject to any disclaimer, the term of this patent is extended or adjusted under 35 U.S.C. 154(b) by 838 days.

(21) Appl. No.: 10/783,808

(22) Filed: Feb. 21, 2004

(65) Prior Publication Data

US 2004/0163338 A1 Aug. 26, 2004

Related U.S. Application Data

(60) Provisional application No. 60/450,004, filed on Feb. 26, 2003, provisional application No. 60/477,985, filed on Jun. 12, 2003, provisional application No. 60/478,036, filed on Jun. 12, 2003.

(51) Int. Cl.
*E04D 13/18* (2006.01)
*H01L 31/042* (2006.01)

(52) U.S. Cl. ..................... 52/173.3; 136/244

(58) Field of Classification Search ................ 52/173.3, 52/200, 235, 506.1, 506.06, 586.1, 586.2, 52/585.1, 582.1, 656.1; 136/244, 251; 126/623, 126/704
See application file for complete search history.

(56) References Cited

U.S. PATENT DOCUMENTS

| | | | |
|---|---|---|---|
| 2,317,428 A * | 4/1943 | Anderson | 52/509 |
| 3,318,561 A | 5/1967 | Finke et al. | |
| 3,468,428 A | 9/1969 | Reibold | |
| 3,844,087 A * | 10/1974 | Schultz et al. | 52/200 |
| 3,944,636 A | 3/1976 | Schuldenberg et al. | |
| 3,954,922 A | 5/1976 | Walker et al. | |

(Continued)

FOREIGN PATENT DOCUMENTS

DE 2427826 B2 2/1979

(Continued)

OTHER PUBLICATIONS

"Intellectual Property Portfolio Assessment Report" UniRac Inc. Patent Portfolio Assessment, Next Steps Research, pp. 1-112 (2006).

(Continued)

*Primary Examiner*—Richard E. Chilcot, Jr.
*Assistant Examiner*—Anthony N Bartosik
(74) *Attorney, Agent, or Firm*—Wilmer Cutler Pickering Hale and Dorr LLP

(57) ABSTRACT

The specification and drawing figures describe and show a low profile mounting system that includes a at least one rail. A plurality of tracks is formed in the rail with opposing jaws. The opposing jaws define a slot. The opposing jaws are disposed in the rail asymmetrically to the longitudinal axis of the rail. At least one ledge monolithically extends from the rail for holding an object such as a solar panel. A coupler is provided for demountably connecting a solar panel to the rail. A cleat also is provided for attaching the system to a surface. A connector connects the rail to the cleat. This abstract is provided to comply with rules requiring an abstract that will allow a searcher or other reader to quickly ascertain the subject matter of the technical disclosure, but this abstract is not to be used to interpret or limit the scope or meaning of any claim.

9 Claims, 8 Drawing Sheets

U.S. PATENT DOCUMENTS

| | | | |
|---|---|---|---|
| 3,977,606 A | 8/1976 | Wyss | |
| 3,978,565 A | 9/1976 | Flisch et al. | |
| 3,978,745 A | 9/1976 | Okamoto et al. | |
| 3,994,999 A | 11/1976 | Phelps | |
| 3,995,689 A | 12/1976 | Cates | |
| 4,003,970 A | 1/1977 | Vodicka et al. | |
| 4,032,604 A | 6/1977 | Parkinson et al. | |
| 4,098,854 A | 7/1978 | Knirsch et al. | |
| 4,114,595 A * | 9/1978 | Barker | 126/648 |
| 4,161,769 A | 7/1979 | Elliott | |
| 4,217,317 A | 8/1980 | Neu et al. | |
| 4,236,283 A | 12/1980 | Marosy | |
| 4,250,779 A | 2/1981 | Feller et al. | |
| 4,252,752 A | 2/1981 | Flandroy et al. | |
| 4,255,991 A | 3/1981 | Lambert | |
| 4,288,394 A | 9/1981 | Ewing et al. | |
| 4,314,492 A | 2/1982 | Feller et al. | |
| 4,336,413 A | 6/1982 | Tourneux | |
| 4,361,524 A | 11/1982 | Howlett | |
| 4,364,155 A | 12/1982 | Synowicki | |
| 4,367,183 A | 1/1983 | Carbonaro et al. | |
| 4,393,859 A * | 7/1983 | Marossy et al. | 52/481.1 |
| 4,413,311 A | 11/1983 | Orenstein | |
| 4,415,957 A | 11/1983 | Schwartz | |
| 4,428,893 A | 1/1984 | Cummings, Jr. et al. | |
| 4,476,065 A | 10/1984 | McKey | |
| 4,479,292 A | 10/1984 | Wheeler | |
| 4,541,627 A | 9/1985 | MacLean et al. | |
| 4,563,277 A | 1/1986 | Tharp | |
| 4,569,805 A | 2/1986 | Hume et al. | |
| 4,584,915 A | 4/1986 | Ichiyanagi et al. | |
| D283,911 S | 5/1986 | Miyamoto et al. | |
| 4,600,975 A | 7/1986 | Roberts | |
| 4,607,461 A | 8/1986 | Adams | |
| 4,621,472 A | 11/1986 | Kloke | |
| 4,631,134 A | 12/1986 | Schussler et al. | |
| 4,662,902 A | 5/1987 | Meyer-Pittroff et al. | |
| 4,679,472 A | 7/1987 | Feller et al. | |
| 4,680,905 A * | 7/1987 | Rockar | 52/200 |
| 4,683,101 A | 7/1987 | Cates | |
| 4,734,191 A | 3/1988 | Schussler et al. | |
| 4,747,980 A | 5/1988 | Bakay et al. | |
| 4,764,314 A | 8/1988 | Schneider et al. | |
| 4,820,412 A | 4/1989 | Meyer-Rudolphi et al. | |
| 4,842,779 A | 6/1989 | Jager et al. | |
| 4,889,620 A | 12/1989 | Schmit et al. | |
| 4,926,656 A | 5/1990 | Hickley et al. | |
| 4,939,963 A | 7/1990 | Leiber et al. | |
| 4,964,977 A | 10/1990 | Komiya et al. | |
| 5,078,205 A | 1/1992 | Bodas et al. | |
| RE33,812 E | 2/1992 | Schneider et al. | |
| 5,088,672 A | 2/1992 | Neuendorf et al. | |
| 5,093,047 A | 3/1992 | Zeppenfeld | |
| 5,095,594 A | 3/1992 | Marosy | |
| 5,099,402 A | 3/1992 | Starniri | |
| 5,152,202 A | 10/1992 | Strauss | |
| 5,155,893 A | 10/1992 | Nussberger et al. | |
| 5,164,020 A * | 11/1992 | Wagner et al. | 136/251 |
| 5,165,780 A | 11/1992 | Katz | |
| 5,181,442 A | 1/1993 | Nezu et al. | |
| 5,204,028 A | 4/1993 | Ruston | |
| 5,232,518 A * | 8/1993 | Nath et al. | 52/509 |
| RE34,381 E | 9/1993 | Barnes et al. | |
| 5,274,978 A * | 1/1994 | Perkonigg et al. | 52/547 |
| 5,283,981 A | 2/1994 | Johnson et al. | |
| 5,330,688 A | 7/1994 | Downs | |
| 5,347,434 A | 9/1994 | Drake | |
| 5,367,843 A * | 11/1994 | Hirai et al. | 52/200 |
| 5,394,664 A * | 3/1995 | Nowell | 52/200 |
| 5,409,549 A * | 4/1995 | Mori | 52/173.3 |
| 5,449,036 A | 9/1995 | Genge et al. | |
| 5,497,587 A * | 3/1996 | Hirai et al. | 52/173.3 |
| 5,570,880 A | 11/1996 | Nordgran | |
| 5,571,338 A * | 11/1996 | Kadonome et al. | 136/251 |
| 5,612,665 A | 3/1997 | Gerhardsen et al. | |
| 5,647,103 A | 7/1997 | Foster | |
| 5,699,989 A | 12/1997 | Guthrie | |
| 5,706,617 A * | 1/1998 | Hirai et al. | 52/173.3 |
| 5,709,057 A | 1/1998 | Johnson, Jr. et al. | |
| 5,718,154 A | 2/1998 | Council, Jr. | |
| 5,724,828 A | 3/1998 | Korenic | |
| 5,746,029 A | 5/1998 | Ullman | |
| 5,779,228 A | 7/1998 | Hansen | |
| 5,787,653 A * | 8/1998 | Sakai et al. | 52/173.3 |
| 5,800,705 A | 9/1998 | Downs | |
| 5,808,893 A | 9/1998 | Pugh et al. | |
| 5,816,318 A | 10/1998 | Carter | |
| 5,944,011 A | 8/1999 | Breslin | |
| 6,065,255 A | 5/2000 | Stern et al. | |
| 6,065,852 A | 5/2000 | Crumley | |
| 6,082,870 A | 7/2000 | George | |
| 6,093,884 A * | 7/2000 | Toyomura et al. | 136/244 |
| 6,105,317 A | 8/2000 | Tomiuchi et al. | |
| 6,111,189 A | 8/2000 | Garvison et al. | |
| 6,135,621 A | 10/2000 | Bach et al. | |
| 6,142,219 A | 11/2000 | Korenic et al. | |
| 6,164,609 A | 12/2000 | Eslambolchi et al. | |
| 6,205,372 B1 | 3/2001 | Pugh et al. | |
| 6,213,200 B1 | 4/2001 | Carter et al. | |
| 6,280,535 B2 | 8/2001 | Miyoshi et al. | |
| 6,360,491 B1 | 3/2002 | Ullman | |
| 6,370,828 B1 * | 4/2002 | Genschorek | 52/200 |
| 6,414,237 B1 * | 7/2002 | Boer | 136/251 |
| 6,416,200 B1 | 7/2002 | George | |
| 6,465,724 B1 * | 10/2002 | Garvison et al. | 136/244 |
| 6,532,398 B2 | 3/2003 | Matsumoto et al. | |
| 6,543,753 B1 | 4/2003 | Tharp | |
| 6,546,312 B1 | 4/2003 | Matsumoto et al. | |
| 6,553,629 B2 | 4/2003 | Grady et al. | |
| 6,564,864 B2 | 5/2003 | Carter et al. | |
| 6,579,047 B2 | 6/2003 | Trionfetti et al. | |
| 6,662,074 B2 | 12/2003 | Pugh et al. | |
| 6,663,694 B2 | 12/2003 | Hubbard et al. | |
| 6,739,561 B2 | 5/2004 | Herzog et al. | |
| 6,755,000 B2 | 6/2004 | Wone Hahn | |
| 6,758,584 B2 | 7/2004 | Bach et al. | |
| 6,839,996 B2 | 1/2005 | Kim et al. | |
| 6,851,820 B2 | 2/2005 | Choi et al. | |
| 6,932,307 B2 | 8/2005 | Guennec et al. | |
| 6,959,517 B2 * | 11/2005 | Poddany et al. | 52/173.3 |
| 6,976,660 B2 | 12/2005 | Lapointe et al. | |
| 7,012,188 B2 * | 3/2006 | Erling | 136/251 |
| 7,043,884 B2 * | 5/2006 | Moreno | 52/235 |
| 7,137,605 B1 | 11/2006 | Guertler | |
| 2002/0096610 A1 | 7/2002 | Fernandez | |
| 2004/0069915 A1 | 4/2004 | Guennec et al. | |
| 2006/0231706 A1 | 10/2006 | Wyatt | |

FOREIGN PATENT DOCUMENTS

| | | |
|---|---|---|
| EP | 0244012 B1 | 11/1987 |
| EP | 0783389 B1 | 4/2002 |
| JP | 58049703 A | 10/1984 |
| WO | WO-2004/077517 | 9/2004 |

OTHER PUBLICATIONS

PCT International Search Report for Application No. PCT/US04/05489 dated Jan. 20, 2006.

* cited by examiner

LOW PROFILE MOUNTING SYSTEM

CROSS-REFERENCE TO RELATED APPLICATION

This application claims benefit of U.S. Provisional Applications for a Low Profile System for Positioning a Module on an Object, filed Feb. 26, 2003, Application No. 60/450,004; an Improved Low Profile System for Positioning a Module on an Object, filed Jun. 12, 2003, Application No. 60/477,985; and an Enhanced Connector Device for a Low Profile System for Positioning a Module on an Object, filed Jun. 12, 2003, Application No. 60/478,036.

FIELD OF TECHNOLOGY

The apparatus and methods disclosed in this document pertain generally to mounting energy-producing panels on surfaces. More particularly, the new and useful low profile mounting system claimed in this document pertains to a system for securely, safely, yet quickly mounting in an aesthetically pleasing configuration one or more photovoltaic modules, panels, and arrays (collectively, "solar panels") to objects that may include, but are not limited to, roof footings, footing grids, roofs, poles, frames, surfaces, or other objects (collectively, "surfaces").

BACKGROUND

Numerous technical problems exist in connection with mounting devices such as photovoltaic panels on surfaces that are, or may be, exposed to varying force vectors induced or caused by wind, snow, rain, and other elements of weather. Additional problems are caused by widely diverse materials from which such surfaces are manufactured. The materials include, for example, wood, slate, metal, tar and tile. All such surfaces may have a variety of sub-surfaces constructed of a similar variety of materials, resulting in differing and unique compositions and densities that result in differing holding properties associated with connectors installed to hold mounting devices to the surfaces. The term "connectors" includes at least nails, screws, bolts, nuts, threaded and unthreaded rods, and similar holding devices. Many technical limitations of prior mounting systems have been considered and overcome in pending U.S. patent application for a System for Removably and Adjustably Mounting a Device on a Surface, application Ser. No. 09/910,655, filed Jul. 20, 2001, and U.S. patent application for Apparatus and Method for Positioning a Module on an Object, application Ser. No. 10/116,384, filed Apr. 4, 2002.

As the use of solar panels to generate all or part of electrical needs for home and industry increases, demand has escalated for a solar panel mounting system that not only is structurally rigid, weather resistant, and easy to install, but also is aesthetically pleasing in design and presentation when mounted on a surface. One such design criteria requires installed solar panels and mounting system to be functional but inconspicuous. A need exists in the industry, therefore, for a new and useful mounting system that is capable of easily and securely mounting solar panels on a surface that results in the installed system and panels being low profile, and thus comparatively inconspicuous and as indiscernible as possible.

SUMMARY

The low profile mounting system includes at least one rail. One or more tracks are formed in the rail with opposing jaws. The opposing jaws define a slot. The opposing jaws are disposed in the rail asymmetrically to the longitudinal axis of the rail and to each other. At least one ledge monolithically extends from the rail for holding an object such as frame of a solar panel. A coupler is provided for demountably connecting a solar panel to the rail. A cleat also is provided for attaching the system to a surface. A connector connects the rail to the cleat.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the low profile mounting system will become apparent to those skilled in the art when read in conjunction with the following description, drawing figures, and appended claims.

The foregoing has outlined broadly the more important features of the invention to better understand the detailed description that follows, and to better understand the contributions to the art. The low profile mounting system is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the low profile mounting system, which is measured by the claims, nor intended to limit the scope of the claims. The novel features of the low profile mounting system are best understood from the accompanying drawing, considered in connection with the accompanying description of the drawing, in which similar reference characters refer to similar parts, and in which:

DETAILED DESCRIPTION

Figure 1:
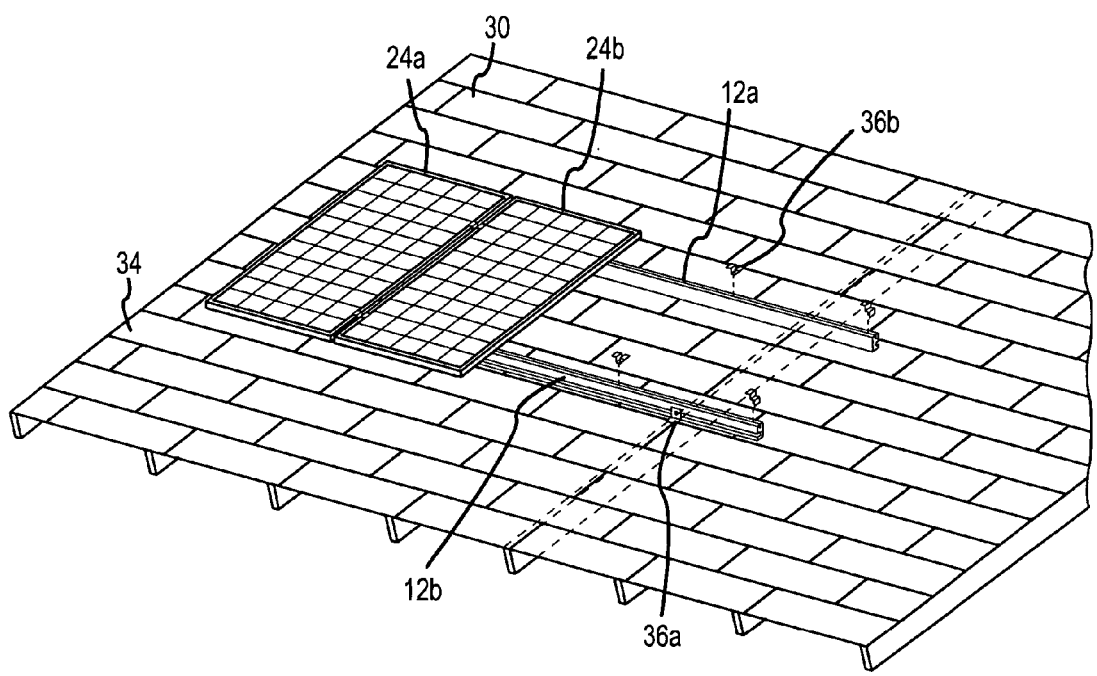
FIG. 1 of the drawing is a perspective view of a mounting system located on a roof.

As shown in FIGS. 1 through 13, a low profile mounting system 10 is provided that in its broadest context includes at least one rail 12. At least one track 14 is formed in rail 12 with opposing jaws 16a, b. Opposing jaws 16a, b define a slot 18. Opposing jaws 16a, b are disposed in rail 12 asymmetrically to the longitudinal axis of rail 12 and to each other. At least one ledge 20a monolithically extends from rail 12 for holding an object such as the frame 22 of a solar panel 24. A coupler 26 is provided for demountably connecting solar panel 24 to rail 12. A cleat 28 also is provided for attaching low profile mounting system 10 to a surface 30. A connector 32 connects rail 12 to cleat 28.

As shown in FIG. 1, rails 12a, b are mounted on a surface 30. Surface 30 is a roof 34. FIG. 1 also shows solar panels 24a, b bounded by frames 22a, b. During installation of Frames 22a, b are connected to rails 12a, b. Rails 12a, b are secured to roof 34. In general, rails 12a, b are secured to roof 34 in part using footers or footings (in this document, a "footing 36"). A number of footings 36a, b traditionally have been used to secure rails 12a, b to roof 34. Footings 36a, b may be L-shaped and constructed of metal or other materials. Footings 36a, b may be attached to roof 34 by inserting lag bolts (not shown) through passages (not shown) in footings 34a, b into rafters 38 beneath roof 34.

As also shown in FIG. 1, in a conventional mounting configuration, solar panels 24a, b are mounted top-down onto rails 12a, b. This may present an aesthetically displeasing appearance because solar panels 24a, b and rails 12a, b present an undesirably excessive elevation. What is desirable is to easily, quickly, and securely mount solar panels 24a, b on a surface 30 that produces a low profile that is comparatively inconspicuous and as indiscernible as possible.

Low profile mounting system 10, as shown in different embodiments in FIGS. 2 through 13, allows an installer to achieve a low profile that is comparatively inconspicuous and as indiscernible as possible.

Figure 2:
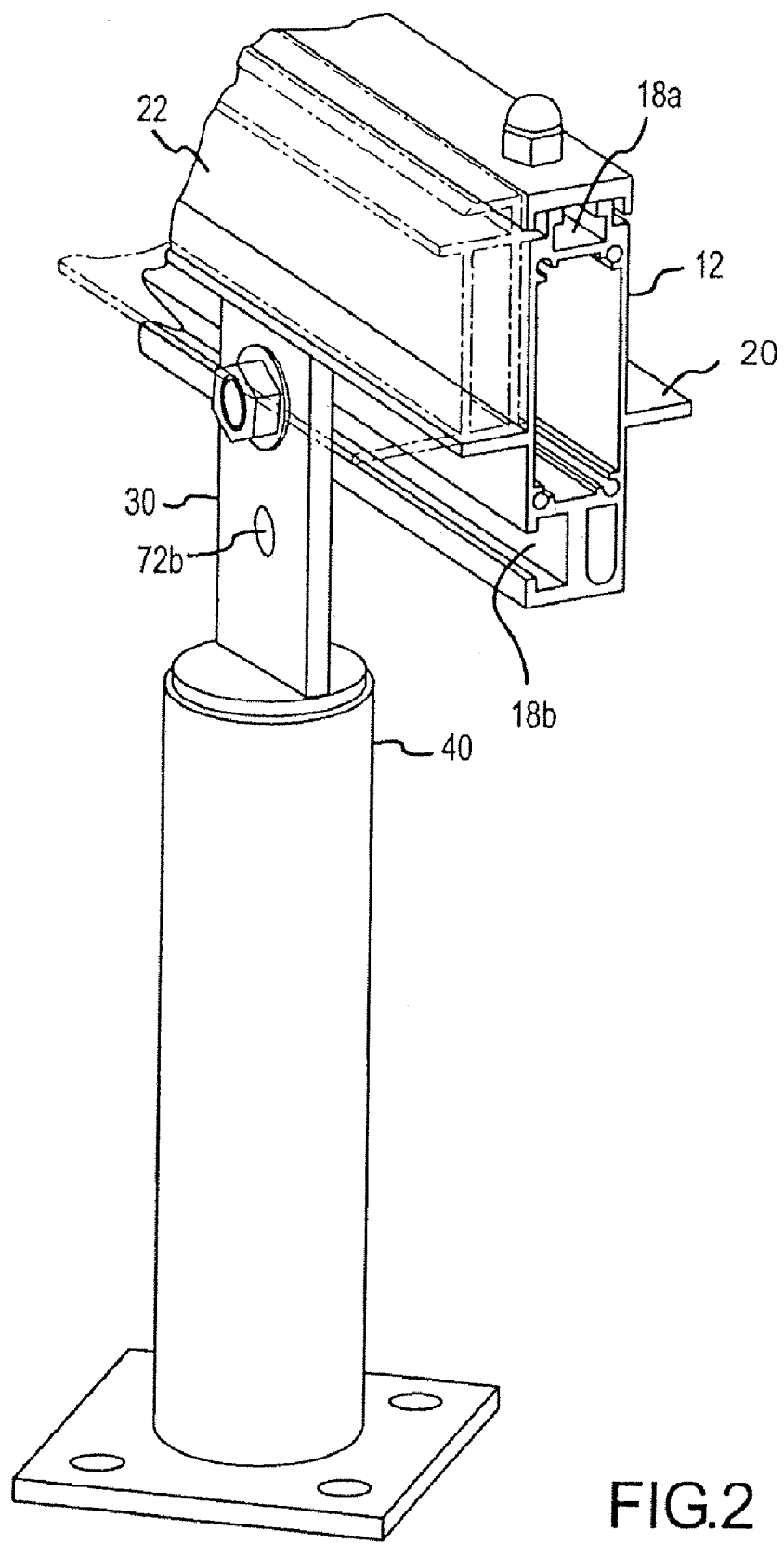
FIG. 2 is a perspective view of a first embodiment of the low profile mounting system in an operative environment.
Figure 3:
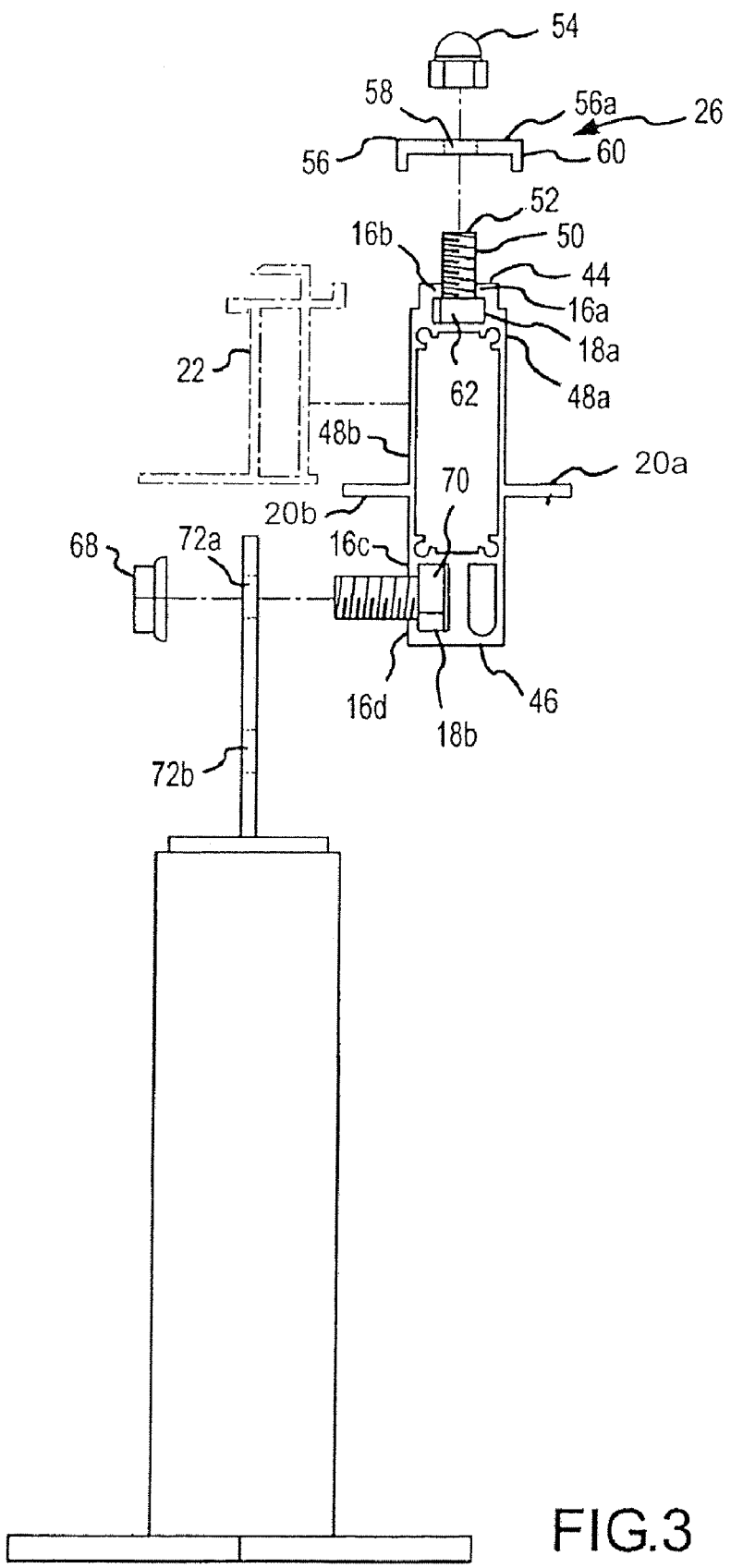
FIG. 3 is an exploded end view of the first embodiment of the first embodiment of the low profile mounting system.

In the embodiment of low profile mounting system 10 illustrated by cross-reference between FIGS. 2 and 3, rail 12 is shown to be mountable on a surface 30 known as a stanchion or stand-off (in this document, a "stanchion 40") rather than on roof 34. Stanchion 40 is useful because of the aforementioned variety of materials used to manufacture a roof 34 and coverings for roof 34. For example, if the covering for roof 34 is made of tile, bolting a rail 12 directly to a tile on roof 34, through a tile (not shown), is undesirable because the tiles may crack or break. To avoid that problem, one or more tiles are removed, stanchion 40 is installed on roof 34, and solar panel 24 is attached to stanchion 40.

To achieve a lower profile than conventional installation apparatus allow, in the embodiment of low profile mounting system 10 illustrated by cross-reference between FIGS. 2 and 3, rail 12 is shown to include at least one ledge 42. As shown, rail 12 is formed with an upper surface 44, a lower surface 46, and opposing walls 48a, b monolithically connected to upper surface 44 and a lower surface 46. At least one ledge 42 extends at a substantially right angle from opposing walls 48a, b in opposite directions from the longitudinal axis through rail 12. Rather than mount solar panel 24 top-down, thus raising the total elevation of an installed mounting system, at least one ledge 42b allows installation of frame 22 of solar panel 24 closer to surface 30.

As also shown in the embodiment shown in FIGS. 2 and 3, rail 12 includes plurality of tracks 14a, b. Plurality of tracks 14a, b is formed in rail 12 with opposing jaws 16a-d defining slots 18a, b. In addition, in the embodiment shown in FIGS. 2 and 3, opposing jaws 16a, b and opposing jaws 16c, d are disposed in rail 12 asymmetrically to each other and to the longitudinal axis of rail 12. The term "asymmetrically" as used in this document means that slot 18a is directionally disposed differently than slot 18b. As indicated, at least one coupler 26 is provided. Coupler 26 includes an attachment device 50. In the embodiment shown in FIGS. 2 and 3, attachment device 50 is a first bolt 52 and a first nut 54. Coupler 26 also includes a clamp 56. Clamp 56, as shown in FIGS. 2 and 3, is substantially a U-shaped gutter 56a formed with an orifice 58 and opposing fins 60. The head 62 of first bolt 52 is slidably insertable into slot 18a of track 14 to extend through opposing jaws 16a, b and, by deploying first nut 54 on first bolt 52, U-shaped gutter 56a may be clamped into ducts 64a, b formed on a conventional frame 22 of solar panel 24. Clamp 56 as shown in all embodiments of low profile mounting system 10 may be a short segment, or may extend the entire length of rail 12 to enhance the aesthetic appearance of an installed low profile mounting system 10, and to aid in resisting wind and rain penetration into the components of low profile mounting system 10.

FIGS. 2 and 3 also show that a second bolt 66 and a second nut 68 are included. Head 70 of second bolt 66 is slidably insertable into track 14b to extend through slot 18b. An opening 72 is provided in an extension 74 of stanchion 40. Second bolt 66 is inserted through opening 72, second nut 68 is inserted on second bolt 66, and the embodiment of low profile mounting system 10 as shown in FIGS. 2 and 3 is securely attached to stanchion 40, which in turn has been attached to roof 34. Solar panel 24 thus provides a low visual profile.

Figure 4:
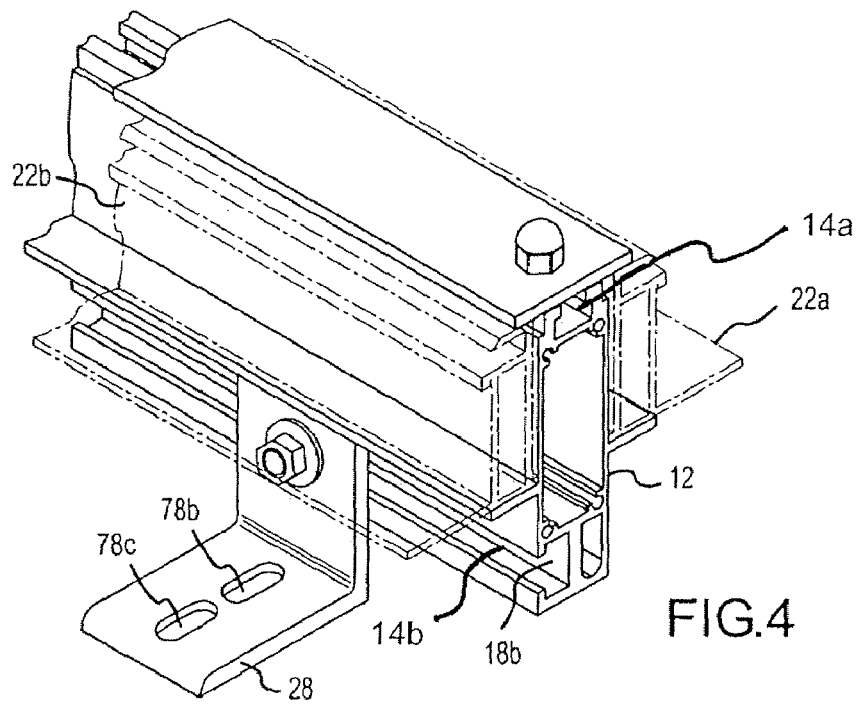
FIG. 4 is a perspective view of a second embodiment of the low profile mounting system in an operative environment.
Figure 5:
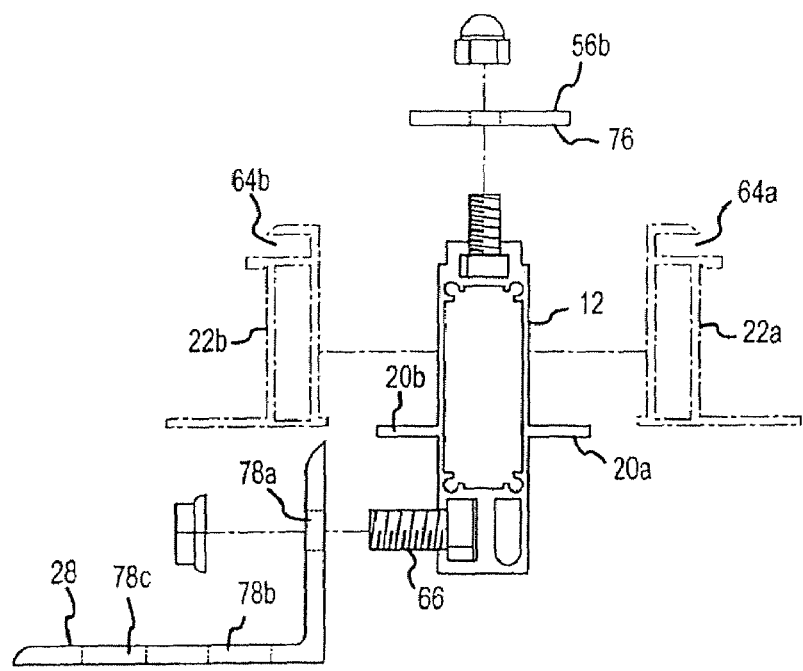
FIG. 5 is an exploded end view of a second embodiment of the low profile mounting system.

In the embodiment low profile mounting system 10 illustrated by cross-reference to FIGS. 4 and 5, low profile mounting system 10 is shown to include a plurality of ledges 20a, b on rail 12. FIGS. 4 and 5 also show an embodiment of low profile mounting system 10 that includes at least one cleat 28. Further, the embodiment shown in FIGS. 4 and 5 shows a clamp 56b in the form of a substantially flat planar surface or plate 76. Clamp 56b is another embodiment of clamp 56 useful in providing a pleasing configuration to an assembled low profile mounting system 10 and for securing ducts 64a, b of a plurality of frames 22a, b on plurality of ledges 20a, b on rail 12. Further, cleat 28 includes at least one hole 78. As shown, cleat 28 includes holes 78a, b, c. Holes 78a, b are used to attach cleat 28 to roof 34 using lag bolts or similar connectors. Hole 78a is used to attach cleat 28 to rail 12 by inserting second bolt 66 into slot 18b and through hole 78c, and attaching second nut 68 to second bolt 66. As a result, a secure, easily installable, and aesthetically pleasing installation of low profile mounting system 10 is achieved.

Figure 6:
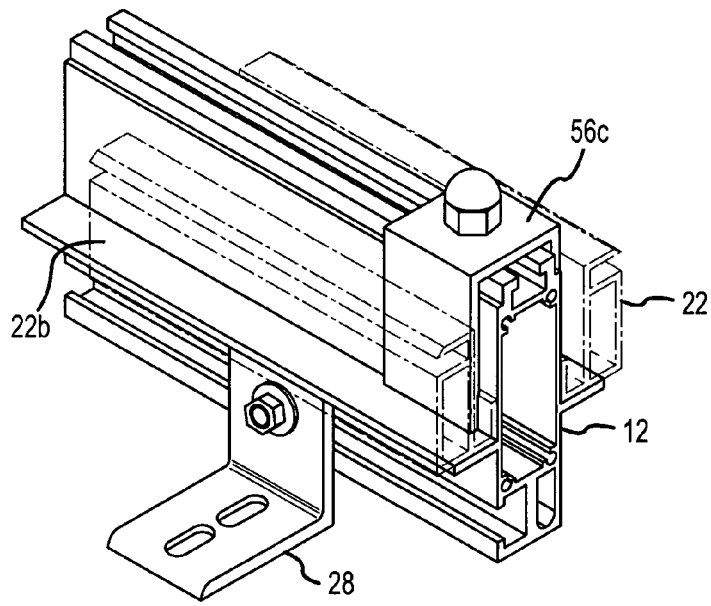
FIG. 6 is a perspective view of a third embodiment of the low profile mounting system in an operative environment.
Figure 7:
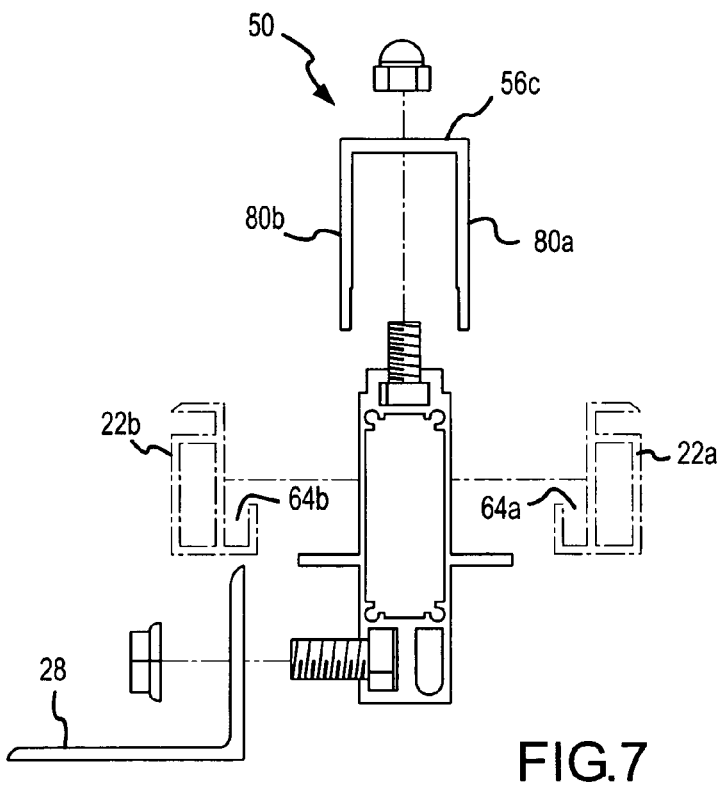
FIG. 7 is an exploded end view of the third embodiment of the low profile mounting system.

In another embodiment of low profile mounting system 10, as shown in FIGS. 6 and 7, an alternative clamp 56 is provided as clamp 56c. Clamp 56c is useful in connection with variations of frame 22 formed with a plurality of ducts 64a, b as shown best in FIG. 7. Clamp 56c also is formed as a gutter, but with opposing arms 80a, b long enough to be removably insertable into ducts 64a, b to hold frame 22 of solar panel 24 tightly against ledge 20a, b when locked into position using attachment device 50.

Figure 8:
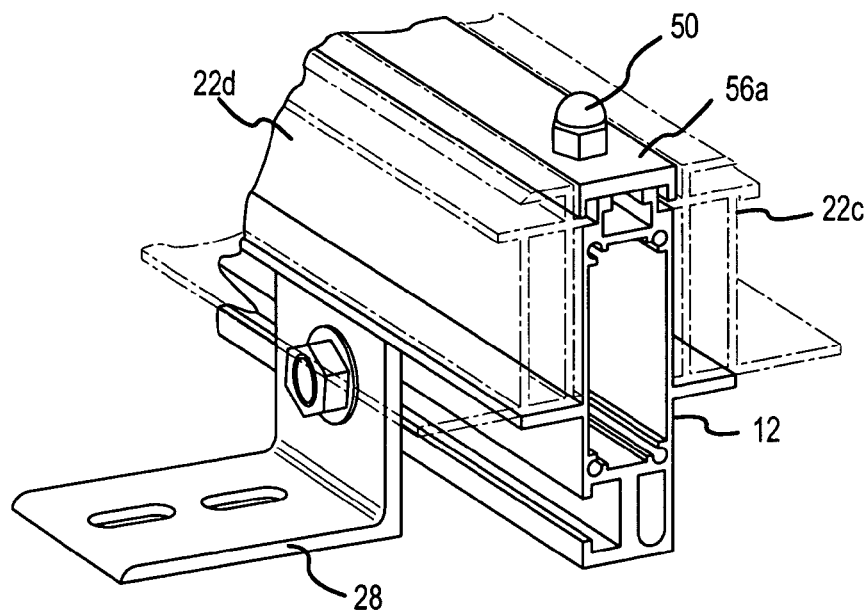
FIG. 8 is a perspective view of a fourth embodiment of the low profile mounting system in an operative environment.
Figure 9:
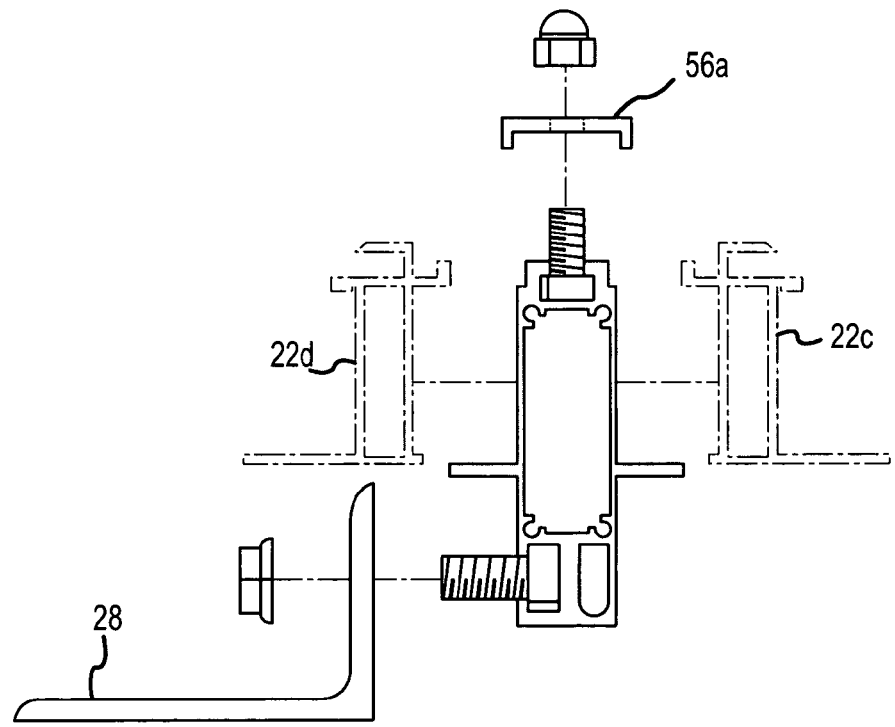
FIG. 9 is an exploded end view of the fourth embodiment of the low profile mounting system.

In the embodiment of low profile mounting system 10 illustrated in FIGS. 8 and 9, clamp 56a, as shown by cross-reference between FIGS. 2 and 3 in connection with a single frame 22 of solar panel 24 being attached to stanchion 40, is shown to be equally useful when disposed in a configuration in which a plurality of opposing frames 22c, d are mounted on a rail 12 that in turn is mounted on cleat 28 for attachment to roof 34.

Figure 10:
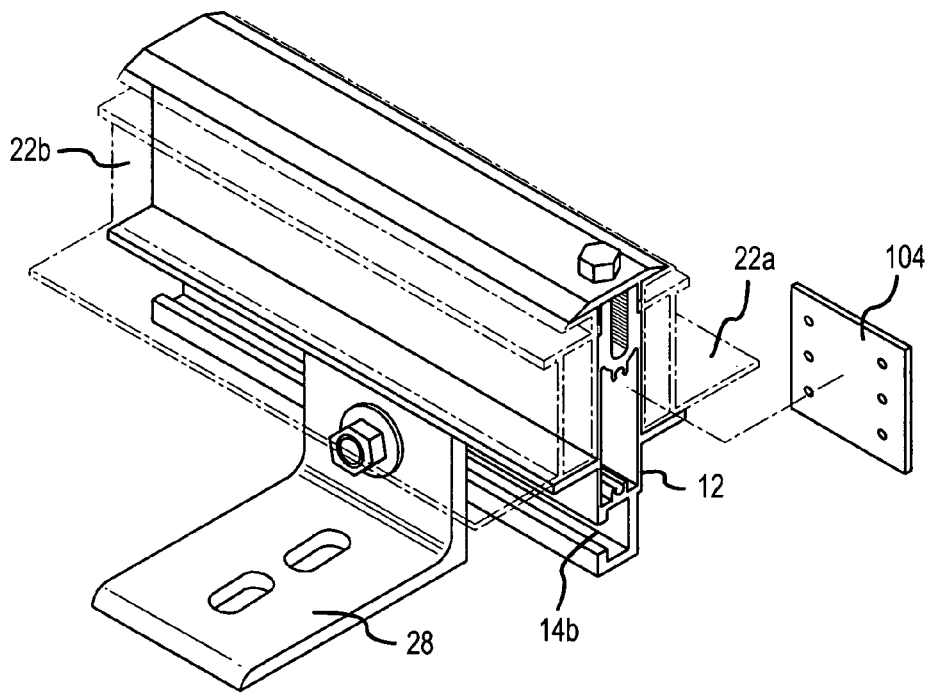
FIG. 10 is a perspective view of a fifth embodiment of the low profile mounting system in an operative environment.
Figure 11:
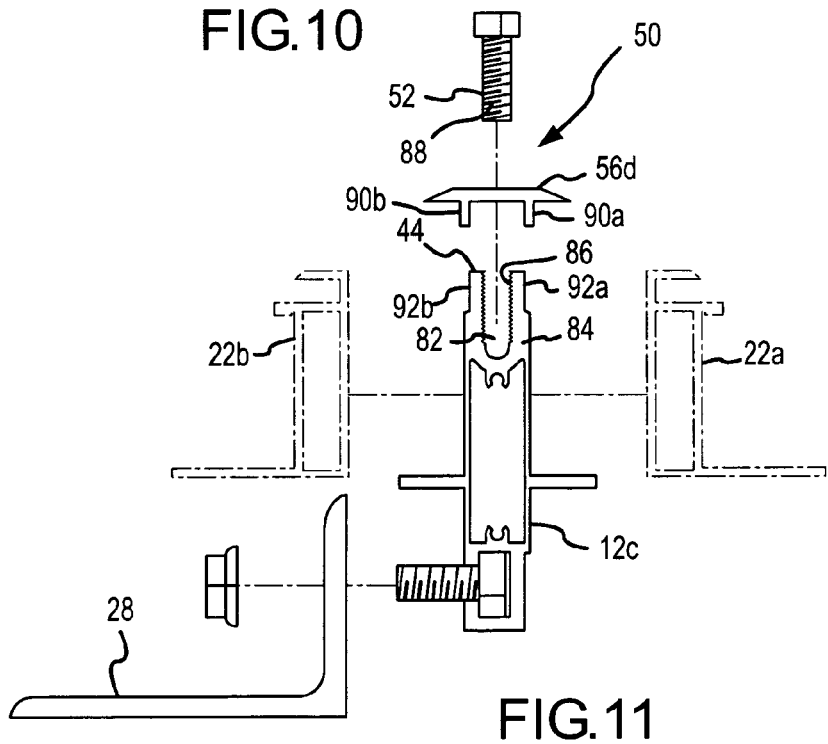
FIG. 11 is an exploded end view of the fifth embodiment of the low profile mounting system.

In another embodiment of low profile mounting system 10, as shown by cross-reference between FIGS. 10 and 11, rail 12 is shown with a track 14b and a longitudinal cavity 82 formed in upper surface 44 of rail 12c. As shown, longitudinal cavity 82 is shaped to receive an attachment device 50. Attachment device 50, as shown in FIG. 11, includes first bolt 52. A receptor body 84 also is monolithically formed adjacent longitudinal cavity 82. As shown in FIG. 11, first threads 86 are formed in receptor body 84 for matable connection with second threads 88 formed on first bolt 52. Further, as also shown in FIG. 11, clamp 56d is formed with a contoured cross-sectional configuration for both aesthetics and for gripping frame 22 of solar panel 24a, b, and includes parallel nubs 90a, b. Parallel nubs 90a, b are designed to fit tightly along exterior surfaces 92a, b of longitudinal cavity 82.

Figure 12:
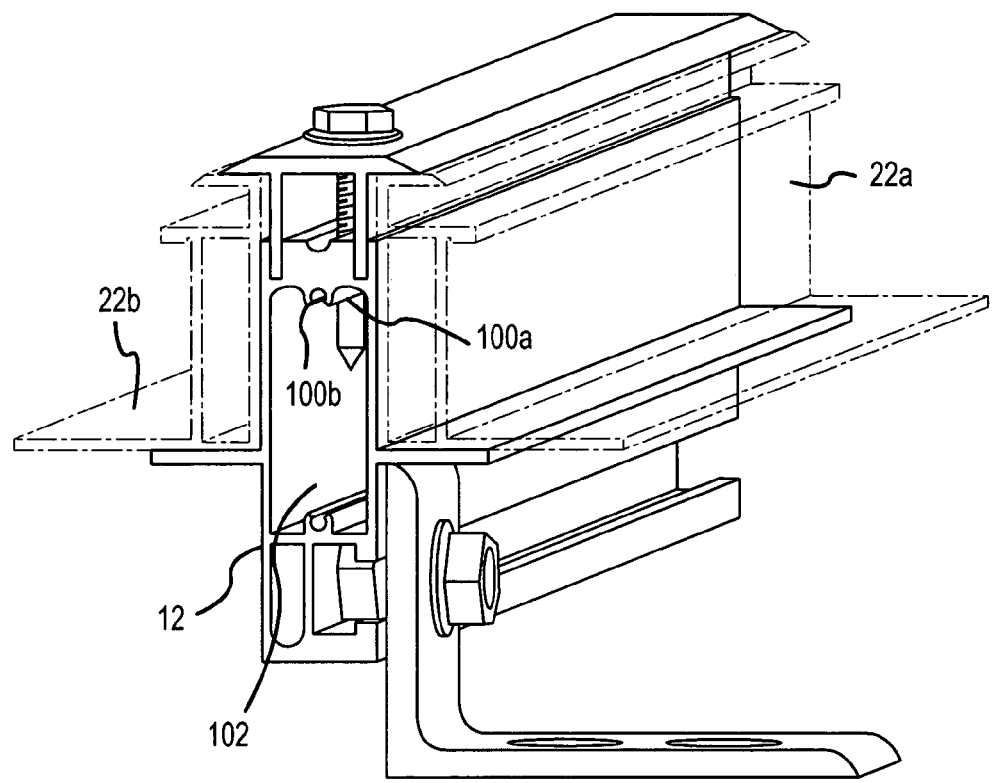
FIG. 12 is a perspective view of a sixth embodiment of the low profile mounting system in an operative environment.
Figure 13:
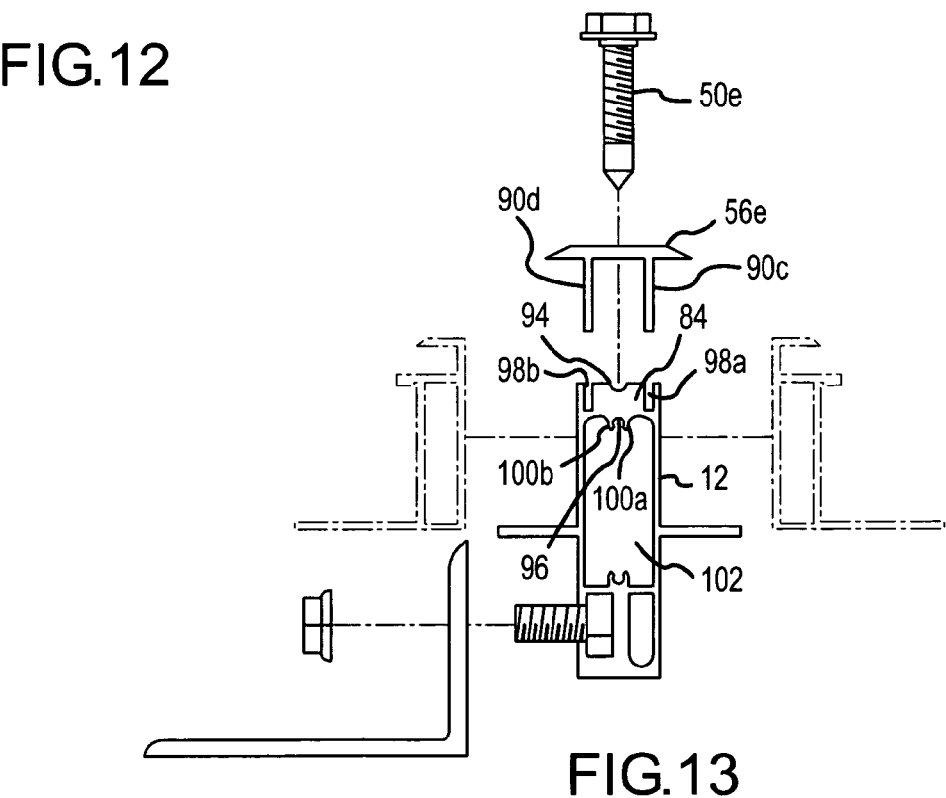
FIG. 13 is an exploded end view of the sixth embodiment of the low profile mounting system.

In the embodiment of low profile mounting system 10 illustrated in FIGS. 12 and 13, longitudinal cavity 82a is shown to be useful as a scribe guide 94 for inserting into rail 12 an attachment device 50 in the form of a screw 50e. As shown, receptor body 84 also includes a groove 96. As also shown, two detents 98a, b are formed in receptor body 84. A variation of clamp 56d, namely 56e, is provided with comparatively longer parallel nubs 90c, d that are insertable into two detents 98a, b in receptor body 84. Receptor body 84 also includes opposing fins 100a, b. Screw 50e is removably insertable through clamp 56e into receptor body 84. Screw 50e extends into the chamber 102 formed in rail 12. Screw 50e is held in place in part by opposing fins 100a, b.

In all embodiments shown in FIGS. 1 through 13, end plates 104, as best shown in FIG. 10, may be placed across low profile mounting system 10 to further add to the aesthetic appearance of an assembled low profile mounting system 10, and to preclude entry of water, wind, and other elements into low profile mounting system 10.

Although FIGS. 1 through 13 shows embodiments of low profile mounting system 10 in which components of low profile mounting system 10 are in certain positions in relationship to one another, the components may be located in any number of other positions. Although the a number of alternative attachment devices and connectors are shown, other fasteners may be used. The low profile mounting system shown in drawing FIGS. 1 through 13 includes a number of non-exclusive embodiments that are merely illustrative of the disclosed low profile mounting system 10. In addition, claim elements and steps in the following appended claims in this document have been numbered solely as an aid in readability and understanding. The numbering is not intended to, and should not be considered as intending to, indicate the ordering of elements and steps in the claims. Means-plus-function clauses in the claims are intended to cover the structures described as performing the recited function that include not only structural equivalents, but also equivalent structures. Thus, although a nail and screw may not be structural equivalents, in the environment of the subject matter of this document a nail and a screw may be equivalent structures.

What is claimed is:

1. A solar panel mounting system comprising:
   a solar panel,
   at least one rail;
   a plurality of tracks formed in the rail with opposing jaws defining a slot,
   at least two of the plurality of tracks formed perpendicularly to one another, and
   wherein the opposing jaws are disposed in the at least one rail asymmetrically to the longitudinal axis of the at least one rail;
   at least one ledge extending from the rail;
   at least one coupler,
   the at least one coupler comprising at least one clamp, and at least one attachment device, and
   the solar panel received between the at least one ledge and at least one coupler;
   at least one end plate; and
   means for connecting the at least one rail to a surface.

2. The mounting system for solar panels, photovoltaic devices or solar energy devices of claim 1, wherein the means for connecting comprise at least one of a nut, a bolt, a stanchion, and a cleat.

3. The mounting system for solar panels, photovoltaic devices or solar energy devices of claim 1, wherein the means for connecting are slidably insertable into at least one of the plurality of tracks.

4. The mounting system for solar panels, photovoltaic devices or solar energy devices of claim 1, wherein the attachment device is at least one of a bolt, a nut, threaded rods, rivets and screws.

5. The mounting system for solar panels, photovoltaic devices or solar energy devices of claim 4, wherein the rail further comprises opposing fins, the screws held in place in part by opposing fins.

6. The mounting system for solar panels, photovoltaic devices or solar energy devices of claim 1, wherein the rail further comprises at least one detent,
   the at least one detent configured to receive a portion of the clamp.

7. The mounting system for solar panels, photovoltaic devices or solar energy devices of claim 1, wherein the ledge extends from the at least one rail at substantially a right angle.

8. The mounting system for solar panels, photovoltaic devices or solar energy devices of claim 1, wherein the attachment device is slidably insertable into at least one of the plurality of tracks.

9. A mounting system for solar panels, photovoltaic devices or solar energy devices comprising:
   at least one rail formed with a plurality of tracks,
   at least two of the plurality of tracks formed perpendicularly to one another,
   a plurality of slots defined within the plurality of tracks by a pair opposing jaws,
   the opposing jaws disposed in the at least one rail asymmetrically to the longitudinal axis of the at least one rail;
   at least one coupler,
   the coupler including at least one clamp and at least one first attachment device,
   the coupler configured to secure the solar panel, photovoltaic device or solar energy device to the rail;
   at least one ledge extending substantially perpendicularly from the rail; and
   at least one second attachment device,
   the second attachment device configured to secure the rail to a surface.

* * * * *

UNITED STATES PATENT AND TRADEMARK OFFICE
CERTIFICATE OF CORRECTION

PATENT NO. : 7,600,349 B2 Page 1 of 1
APPLICATION NO. : 10/783808
DATED : October 13, 2009
INVENTOR(S) : John E. Liebendorfer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this

Fifth Day of October, 2010

David J. Kappos
*Director of the United States Patent and Trademark Office*